(12) United States Patent
Phaal

(10) Patent No.: US 8,504,686 B2
(45) Date of Patent: Aug. 6, 2013

(54) METHOD AND APPARATUS FOR COMBINING DATA ASSOCIATED WITH HARDWARE RESOURCES AND NETWORK TRAFFIC

(75) Inventor: Peter Phaal, San Francisco, CA (US)

(73) Assignee: InMon Corp., San Francisco, CA (US)

( * ) Notice: Subject to any disclaimer, the term of this patent is extended or adjusted under 35 U.S.C. 154(b) by 123 days.

(21) Appl. No.: 12/917,403

(22) Filed: Nov. 1, 2010

(65) Prior Publication Data

US 2011/0113136 A1 May 12, 2011

Related U.S. Application Data

(60) Provisional application No. 61/318,736, filed on Mar. 29, 2010, provisional application No. 61/257,403, filed on Nov. 2, 2009.

(51) Int. Cl.
*G06F 15/16* (2006.01)
(52) U.S. Cl.
USPC .......................................................... 709/224
(58) Field of Classification Search
USPC .................................. 709/200–202, 224, 227
See application file for complete search history.

(56) References Cited

U.S. PATENT DOCUMENTS

| 7,856,549 B2 * | 12/2010 | Wheeler | 713/1 |
| 2007/0204266 A1 * | 8/2007 | Beaty et al. | 718/1 |
| 2008/0222638 A1 * | 9/2008 | Beaty et al. | 718/100 |
| 2010/0211956 A1 * | 8/2010 | Gopisetty et al. | 718/104 |
| 2010/0251254 A1 * | 9/2010 | Nishiguchi et al. | 718/104 |
| 2011/0072138 A1 * | 3/2011 | Canturk et al. | 709/226 |

OTHER PUBLICATIONS

Phaal, et al., "sFlow Version 5," sFlow, RFC # 2737, Jul. 2004, pp. 1-50, at URL: http://www.sflow.org/sflow_version_5.txt.

* cited by examiner

*Primary Examiner* — Moustafa M Meky
(74) *Attorney, Agent, or Firm* — Kilpatrick Townsend & Stockton, LLP; Ardeshir Tabibi

(57) ABSTRACT

To generate performance statistics of a host, a physical or virtual component of the host is associated with network interface information corresponding to one or more physical or virtual network interface devices disposed in the host. The performance statistics of the physical or virtual component together with the associated network interface information are periodically transmitted. The network interface information may be a MAC address or an SNMP ifIndex associated with the physical or virtual network interface devices. The SNMP ifIndex may be used to retrieve a corresponding MAC address. The transmitted network interface information is used to analyze the performance statistics of the associated physical or virtual component. The performance statistic may represent a CPU usage, a memory usage, a disk usage, an I/O usage, power consumption, or temperature of the physical or virtual component.

42 Claims, 2 Drawing Sheets

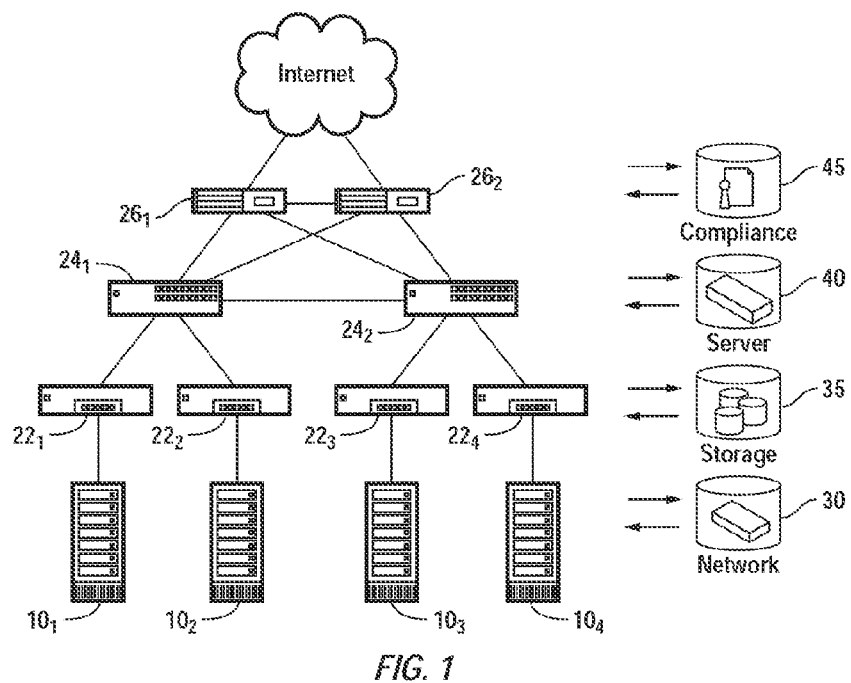
FIG. 1
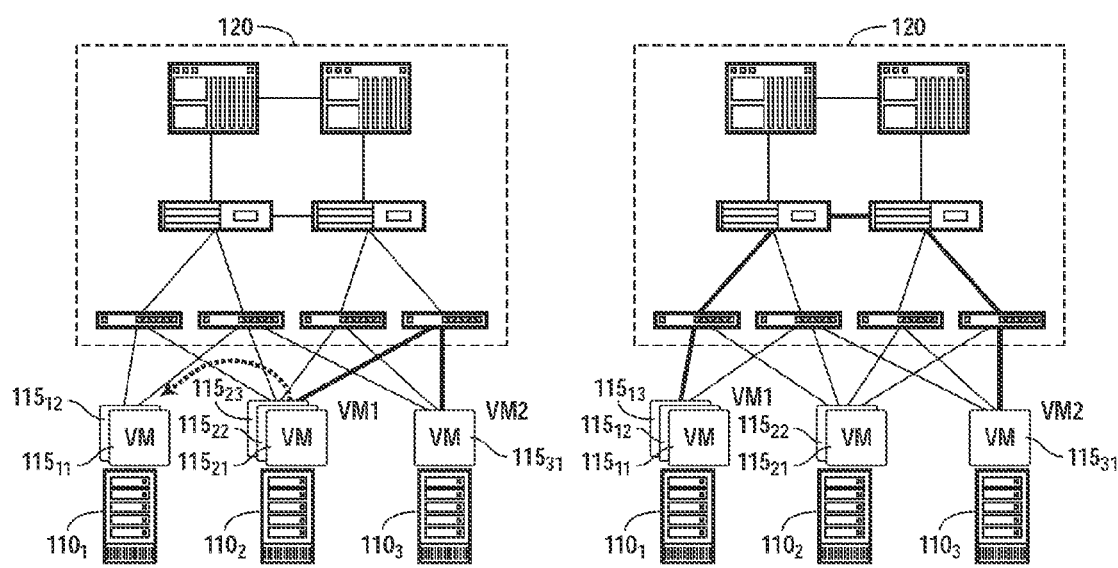
FIG. 2A
FIG. 2B

METHOD AND APPARATUS FOR COMBINING DATA ASSOCIATED WITH HARDWARE RESOURCES AND NETWORK TRAFFIC

CROSS-REFERENCES TO RELATED APPLICATIONS

The present application claims benefit under 35 USC 119 (e) of U.S. provisional application No. 61/257,403, filed Nov. 2, 2009, and U.S. provisional application No. 61/318,736, filed Mar. 29, 2010, the contents of which are incorporated herein by reference in their entirety.

The present application incorporates herein by reference the entire contents of the following publication: "sFlow Version 5", http://www.sflow.org/sflow_version_5.txt, by Peter Phaal and M. Levine; IETF, "RFC 2737: Entity MIB (Version 2)", December 1999.

BACKGROUND OF THE INVENTION

Conventionally, management of networked computer systems in organizations is divided among a number of groups such as networking, storage, systems, and possibly groups in charge of maintaining regulatory compliance. Enterprise applications require resources from each such functional area; a failure in any of these areas can have a significant impact on the business. The strategy of splitting the management responsibilities by functional areas has worked so far because the functional areas have traditionally been loosely coupled and the data center environments have been relatively static.

The trend towards convergence of computing, storage and networking in order to create a more dynamic and efficient infrastructure makes these functions dependent on each other. For example, server virtualization means that a small change made by the systems group may have a major effect on the network bandwidth. The increasing demand for bandwidth by networked storage accounts for a significant proportion of the overall network bandwidth, thereby making the network vulnerable to changes made by the storage group. In order to maintain the services in a converged environment, the complex relationships between various network elements need to be managed properly.

FIG. 1 shows a network communication system 100 that includes a multitude of switches configured to connect a multitude of hosts to each other and to the Internet. Four exemplary hosts $10_1$, $10_2$, $10_3$, $10_4$ (alternatively and collectively referred to as host 10), are shown as being in communication with the Internet via switches $22_1$, $22_2$, $22_3$, $22_4$, (alternatively and collectively referred to as switch 22), switches $24_1$, $24_2$ (alternatively and collectively referred to as switch 24), and switches $26_1$, $26_2$ (alternatively and collectively referred to as switch 26). Network communication system 100 is controlled, in part, by network equipment group 30, storage group 35, server group 40, and regulatory compliance group 45. Each such group monitors its own resources and uses its own management tools and thus has very limited visibility into the other components of the data center.

FIGS. 2A and 2B show the challenge faced in managing a networked system using a conventional technique. FIG. 2A shows a network communication system that includes a multitude of servers $110_1$, $110_2$, $110_3$ as well as a multitude of switches collectively identified using reference number 120. Each server $110_i$ is shown as having one or more associated virtual machines (VM) $115_i$. For example, server $110_1$ is shown as having associated VMs $115_{11}$ and $115_{12}$; server $110_2$ is shown as having associated VMs $115_{21}$, $115_{22}$, and $115_{23}$; and server $110_3$ is shown as having associated VM $115_{31}$. Assume that a system manager decides to move virtual machine $115_{23}$ from server $110_2$ to server $110_1$—shown as VM $115_{13}$ in FIG. 2B following the move. The system management tools show that there is enough capacity on the destination server $110_1$ thus suggesting that the move would be safe. However, the move can cause the storage traffic, which had previously been confined to a single switch, to congest links across the data center causing system wide performance problems. The conventional siloed approach in which different teams manage the network, storage and servers has a number of shortcomings.

BRIEF SUMMARY OF THE INVENTION

In accordance with one embodiment of the present invention, a method for generating a host performance statistics includes, in part, associating a physical or virtual component of the host with network interface information corresponding to one or more physical or virtual network interface devices disposed in the host, and periodically transmitting the performance statistics of the physical or virtual component together with the associated network interface information. In one embodiment, the network interface information is at least one media access control (MAC) address associated with the one or more physical or virtual network interface devices. In another embodiment, the network interface information is at least one SNMP ifIndex associated with the one or more physical or virtual network interface devices. The SNMP ifIndex may be used to retrieve a corresponding MAC address. The method further includes analyzing the transmitted performance statistics of the physical or virtual component using the transmitted associated network interface information.

In one embodiment, the performance statistic represents a CPU usage of the physical or virtual component. In one embodiment, the performance statistic represents a memory usage of the physical or virtual component. In one embodiment, the performance statistic represents a disk usage of the physical or virtual component. In one embodiment, the performance statistic represents an I/O usage of the physical or virtual component. In one embodiment, the performance statistics represents a power consumption of the physical or virtual component. In one embodiment, the performance statistics represents a temperature of the physical or virtual component.

In accordance with one embodiment of the present invention, a computer readable medium includes instructions that when executed by a processor cause the processor to generate performance statistics. To achieve this, the instructions cause the processor to associate a physical or virtual component of the host with network interface information corresponding to one or more physical or virtual network interface devices disposed in the host. The instructions further cause the processor to periodically transmit performance statistics of the physical or virtual component together with the associated network interface information. In one embodiment, the network interface information is at least one MAC address associated with the physical or virtual network interface devices. In one embodiment, the network interface information is at least one SNMP ifIndex associated with the one or more physical or virtual network interface devices. The SNMP ifIndex may be used to retrieve a corresponding MAC address. The transmitted network interface information is used to analyze the performance statistics of the associated physical or virtual component.

In one embodiment, the performance statistic represents a CPU usage of the physical or virtual component. In one embodiment, the performance statistic represents a memory usage of the physical or virtual component. In one embodiment, the performance statistic represents a disk usage of the physical or virtual component. In one embodiment, the performance statistic represents an I/O usage of the physical or virtual component. In one embodiment, the performance statistics represents a power consumption of the physical or virtual component. In one embodiment, the performance statistics represents a temperature of the physical or virtual component.

A system operative to generate performance statistics, includes, in part, a module operative to associate a physical or virtual component of a host with network interface information corresponding to one or more physical or virtual network interface devices disposed in the host, and a module operative to periodically transmit performance statistics of the physical or virtual component together with the associated network interface information. In one embodiment, the network interface information is at least one MAC address associated with the one or more physical or virtual network interface devices. In one embodiment, the network interface information is at least one SNMP ifIndex associated with the one or more physical or virtual network interface devices. The SNMP ifIndex may be used to retrieve a corresponding MAC address. The network interface information is used to analyze the transmitted performance statistics of the associated physical or virtual component.

In one embodiment, the performance statistic represents a CPU usage of the physical or virtual component. In one embodiment, the performance statistic represents a memory usage of the physical or virtual component. In one embodiment, the performance statistic represents a disk usage of the physical or virtual component. In one embodiment, the performance statistic represents an I/O usage of the physical or virtual component. In one embodiment, the performance statistics represents a power consumption of the physical or virtual component. In one embodiment, the performance statistics represents a temperature of the physical or virtual component. In one embodiment, the system includes software modules. In one embodiment, the system includes hardware modules. In one embodiment, the system includes software and hardware modules.

BRIEF DESCRIPTION OF THE DRAWINGS

FIG. 1 shows a network communication system that includes a multitude of switches configured to connect a multitude of hosts to each other and to the Internet.

FIG. 2A shows a network communication system that includes a multitude of hosts and switches.

FIG. 2B shows the network communication system of FIG. 2A after one of its virtual machines has been moved from one host to another host.

DETAILED DESCRIPTION OF THE INVENTION

Convergence and interdependence between the resources in a data center require a cross functional approach to management in order to ensure successful operation. To achieve greater scalability, shared visibility into all elements of a data center, and an integrated management strategy, in accordance with one aspect of the present invention, all components in a data center are monitored by a single traffic monitoring system. Data center wide visibility is critical to ensuring that each group is aware of the impact of its actions on shared resources and to providing the information needed to enhance the control of the data center.

Current trends toward Virtualization, Converged Enhanced Ethernet (CEE), Fibre Channel over Ethernet (FCoE), Service Oriented Architectures (SOA) and Cloud Computing are part of a broader re-architecture of the data centers in which enterprise applications are decomposed into simpler elements that can be deployed, moved, replicated and connected using high-speed switched Ethernet.

An integrated approach to management is needed if the full benefits of a converged data center are to be realized. Ensuring network-wide visibility into the storage, network and services running in the data center, their traffic volumes, and their dependencies are critical components of an integrated management strategy. In order to achieve data center wide visibility, every layer of the data center network, including the core, distribution, top of rack and blade server switches are taken into account, as described further below in accordance with various embodiments of the present invention.

In accordance with one embodiment of the present invention, traditional hardware performance statistics collected by monitoring, for example, CPU, memory, I/O, and the like, are labeled using network interface information—as a global identifier—to enable combining and integrating this statistics with the data collected from the network traffic (LAN and SAN). In one embodiment, the MAC addresses (layer 2 network address) of the network interface devices are used as the network interface information. In another embodiment, the SNMP indices associated with the network interface devices are used as the network interface information. It is understood that other global network interface information may also be used.

The trend toward virtualization, cloud computing and service oriented architectures means that enterprise software is being increasingly decomposed into simpler elements that communicate over the network. Each of these elements has one or more MAC addresses that are used in accordance with embodiments of the present invention to identify the network and their associated computational resources.

Figure 3:
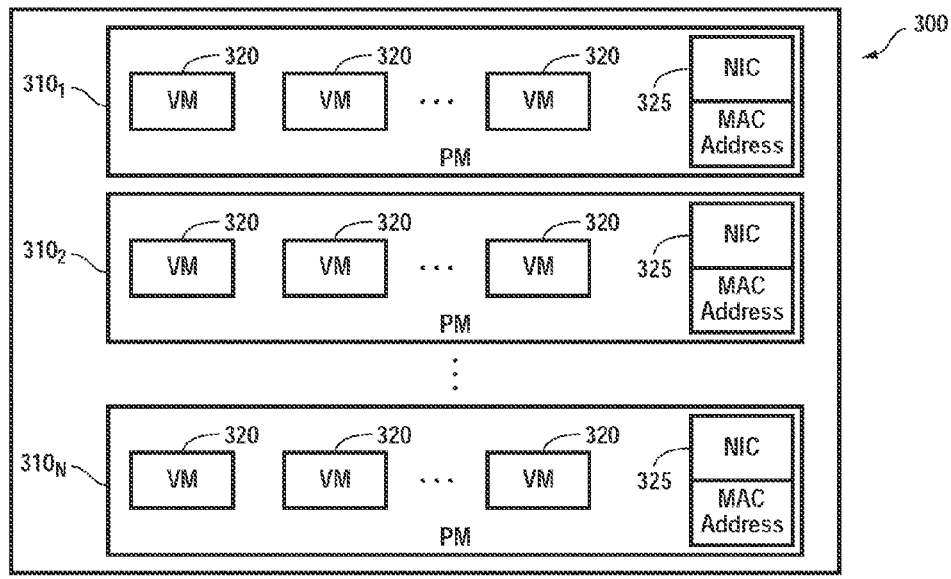
FIG. 3 is a simplified view of a number of blocks of a host.
Figure 4:
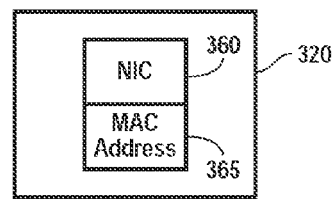
FIG. 4 shows a network interface card and associated MAC address of a virtual machine.

FIG. 3 is a simplified view of a number of blocks of a server (alternatively referred to herein as host) 300. Host 300 is shown as including a multitude of physical machines (PM) $310_i$ where i is an index ranging from 1 to N. A stand-alone host may have a single physical machine. A blade server may have a large number of physical machines—one per blade. Each PM $310_i$ is shown as possibly including a number of virtual machines (VM) 320. It is understood that that the number of VMs may vary in different PMs. It is further understood that some PMs may have no VM. Each PM $310_i$ also includes one or more network interface device 325 (also referred to herein as network interface card NIC or network adapter card) one of which is shown in each PM $310_i$. Each network interface card 325 may have one or more associated MAC addresses, as is also shown in FIG. 3. Furthermore, each VM 320 may include one or more virtual NICs 360 each of which may have one or more associated MAC addresses 365, as shown in FIG. 4.

In accordance with embodiment of the present invention, performance statistics related to PM and VM entities are exported using a unified data model that permits correlation between the host statistics and the network statistics. The unified data model enables labeling of the performance statistics with the network interface information associated with and linked to the components residing in the physical and virtual machines. The following description of the embodiments of the present invention are described with respect to the sFlow® standard, a leading, multi-vendor standard for monitoring high-speed switched and routed networks. It is understood that embodiments of the present invention are equally applicable to any other network monitoring technology. Detailed description of the sFlow® technology is provided, for example, on http://www.inmon.com/technology/index.php; and http://sflow.org/.

The sFlow® measurement technology, built into computers and network equipment from a number of leading vendors, such as HP®, IBM®, Dell®, Brocade®, BLADE®, Juniper®, Force10® and 3Com®, ensures data center wide visibility of all resources, including switches, storage servers, blade servers and virtual servers. As networks, systems and storage converge, the visibility provided by the sFlow® in the network provides an increasingly fuller picture of all aspects of the data center operations, thus enabling effective management and control of the network resources and delivering the converged visibility needed to manage the converged data center.

Unlike other monitoring technologies, the sFlow® provides an integrated, end-to-end, view of the network performance. This integration substantially increases the value of information by making it actionable. For example, identifying that an application is running slowly isn't enough to solve a performance problem. However, if it is also known that the server hosting the application is seeing poor disk performance, can link the disk performance to a slow NFS server, can identify the other clients of the NFS server, and can finally determine that all the requests are competing for access to a single file, then the decision to take action can be much more informed. It is this ability to link data together, combined with the scalability to monitor every resource in the data center that the sFlow® advantageously provides.

The sFlow® standard includes physical and virtual server performance metrics. The sFlow® specification describes a coherent framework that builds on the sFlow® metrics exported by most switch vendors, thus linking network, server and application performance monitoring to provide an integrated picture of the network performance. The following description of the embodiments of the present invention are provided with reference to the MAC address of a network interface card as the global identifier and network interface information. It is understood, however, that embodiments of the present invention are equally applicable to any other global network interface information such as the SNMP ifIndex, and the like. The SNMP protocol provides remote access to a hierarchical database of information associated with each device on the network. The ifIndex is the index that allows information associated with a network interface to be retrieved. Accordingly, in some embodiments, the ifIndex is used to retrieve the MAC address(es) associated with an interface.

Figure 5:
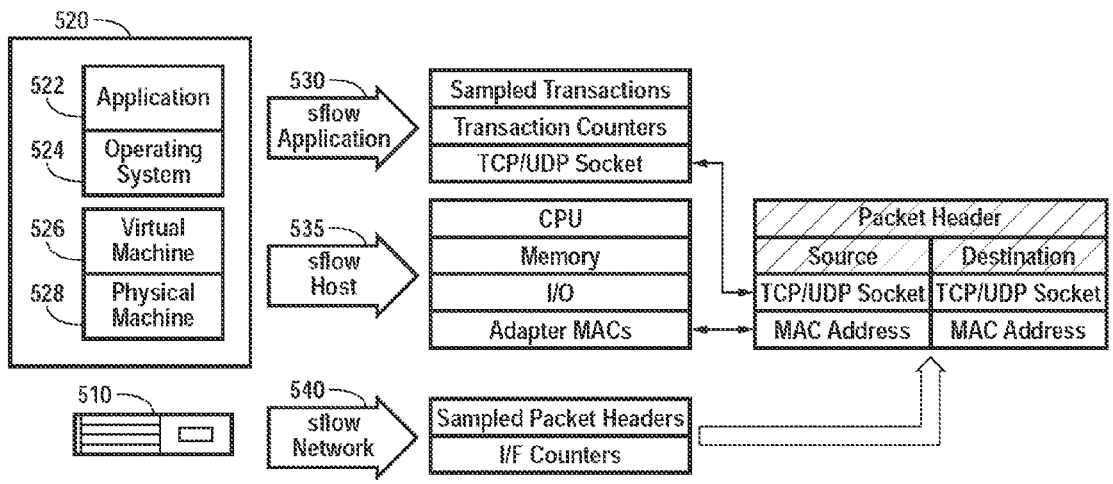
FIG. 5 shows a traffic monitoring system that uses a packet header information to link the network performance with the performance metrics collected from servers and applications, in accordance with one embodiment of the present invention.

FIG. 5 shows the manner in which packet header information used by a network device is used to link the network performance with the performance metrics collected from servers and applications, in accordance with one embodiment of the present invention. The network traffic monitoring, which in this exemplary embodiment is shown as the sFlow®, includes an application module (alternatively referred to herein as component) 530, a host module 535, and a network module 540. It is understood that modules 530, 535 and 540 may be software modules, hardware modules, or a combination of software and hardware modules. The network traffic monitoring application is adapted to link the performance of the network traffic controlled by networking device 510 with the performance metrics collected from server 520 from which the network traffic is generated or to which the network traffic is directed.

Server 520 is shown as including one or more physical machines 528, and one or more virtual machines 526. Operating system 524 and applications 522 are run on server 520. Application module 520 is adapted to sample transactions and extract the corresponding TCP/UDP socket information that identify individual application instances. Application module 540 (which may be, e.g., a web server or file server application) also maintains a count of the number of such transactions using its transaction counters. Host module 535 is adapted to monitor the performance of the various components of the server, such as its CPU, memory, the I/O and its associated physical and virtual network interface adapter cards which contain one or corresponding MAC addresses. Network module 540 is adapted to sample packet headers. Network module 540 also includes a number of I/F counters which maintain a count of the number of sampled packet headers. Each sampled packet header contains one or more MAC addresses corresponding to the physical and virtual network adapter cards as well as the TCP/UDP socket information identifying individual application instances.

Accordingly, the network traffic monitoring application links the performance of the network traffic—flowing through networking device 510—with the performance metrics collected from server 520—which is the source or destination of the network traffic. In other words, the collected performance metrics includes a host structure containing the MAC addresses associated with the network adapter cards of the host. The inclusion of the MAC addresses advantageously provides a common key linking the server performance metrics (CPU, Memory, I/O etc.) to the network performance measurements (network flows, link utilizations, etc.), thereby providing a fuller picture of the server's performance. A real-time map of the physical and logical relationships between entities on the network may thus be provided to a network traffic analyzer to further analyze the performance data. A scalable counter push mechanism, partly defining the host structure and as described further below, is used by the network devices to export counter values that track the performance of CPU, memory, I/O, and the like For physical machine performance metrics, the sFlow® Host Structures is further described by the Ganglia project (http://ganglia.info/), incorporated herein by reference in its entirety, defining a common set of metrics across different operating systems, including Windows, Linux (Fedora/RedHat/CentOS, Debian, Gentoo, SuSE/OpenSuSE), Solaris, FreeBSD, NetBSD, OpenBSD, DragonflyBSD and AIX. The MAC addresses associated with each physical machine are exported together with its performance metrics so as to provide a link between the physical machine's performance and the network activity.

For virtual machine performance metrics, the sFlow® Host Structures is further specified by the libvirt project (http://libvirt.org/), incorporated herein by reference in its entirety, which defines a standard set of metrics that can be collected from a wide variety of virtualization platforms, including: Xen, QEMU, KVM, LXC, OpenVZ, User Mode Linux, VirtualBox, VMWare ESX and GSX. The MAC addresses associated with each virtual machine are exported together with its performance metrics so as to provide a link between the virtual machine's performance and the network activity.

The sFlow® Host Structures (http://www.sflow.org/sflow_host.txt), incorporated herein by reference in its entirety, document also describes the extension of sFlow®'s sampling mechanism to include application transaction sampling. Examples of application level transactions include HTTP requests to a web server, NFS/CIFS requests to a file server, memcached requests and operations performed by a Hadoop cluster. An application sFlow® agent samples completed transactions, capturing information about each completed request, including size, duration, type, URL, file name etc. Each application transaction sample is linked to the network through the inclusion of TCP/UDP socket information which can be matched to packet header information from network devices.

An efficient and improved data structure is developed to export host related data. This structures enables an sFlow® agent to export additional information about host resources and without impacting existing collectors. The new protocol supporting the traffic flow management of sFlow® enables the addition of new data structures without impacting existing collectors. A host device uses the new data structure to report on host resources.

Flow Datagram Extensions

The SNMP Entity-MIB [2] may be used to describe the physical and logical containment hierarchy of host resources. Physical machines may be modeled as physical entities, an already supported sFlow data source type. Virtual machines may be modeled as logical entities. Extending sFlow support for logical entities provides a vehicle for exporting data relating to virtual machines.

The sFlow MIB identifies data sources by SNMP OID, so the only change needed would be a comment indicating that a resource is a valid data source type:

```
SFlowDataSource ::= TEXTUAL-CONVENTION
    STATUS  current
    DESCRIPTION
        "Identifies a source of sFlow data.
```

The following data source types are currently defined:

```
- ifIndex.<I>
SFlowDataSources of this traditional form are called
'port-based'.
```

Ideally the sampling entity will perform sampling on all flows originating from or destined to the specified interface. However, if the switch architecture only allows input or output sampling then the sampling agent is permitted to only sample input flows input or output flows. Each packet must only be considered once for sampling, irrespective of the number of ports it will be forwarded to. Note: Port 0 is used to indicate that all ports on the device are represented by a single data source. "sFlowFsPacketSamplingRate" applies to all ports on the device capable of packet sampling.

smonVlanDataSource.<V>

An SFlowDataSource of this form refers to a 'Packet-based VLAN' and is called a 'VLAN-based' dataSource. <V> is the VLAN ID as defined by the IEEE 802.1Q standard. The value is between 1 and 4094 inclusive, and it represents an 802.1Q VLAN-ID with global scope within a given bridged domain. Sampling is performed on all packets received that are part of the specified VLAN (no matter which port they arrived on). Each packet will only be considered once for sampling, irrespective of the number of ports it will be forwarded to.

entPhysicalEntry.<N>

An SFlowDataSource of this form refers to a physical entity within the agent (e.g. entPhysicalClass=backplane(4)) and is called an 'entity-based' dataSource. Sampling is performed on all packets entering the resource (e.g. If the backplane is being sampled, all packets transmitted onto the backplane will be considered as single candidates for sampling irrespective of the number of ports they ultimately reach).

entLogicalEntry.<L>

An SFlowDataSource of this form refers to a logical entity within the agent and is called a 'logical-entity-based' dataSource. Sampling is performed on all packets entering the resource (e.g. If the backplane is being sampled, all packets transmitted onto the backplane will be considered as single candidates for sampling irrespective of the number of ports they ultimately reach). Note: Since each SFlowDataSource operates independently a packet that crosses multiple DataSources may generate multiple flow records."

In addition, a mapping for logical entity data sources in the sFlow datagram needs to be specified:

```
/* sFlowDataSource encoded as follows:
    The most significant byte of the source_id is used to indicate the type
    of sFlowDataSource:
        0 = ifIndex
        1 = smonVlanDataSource
        2 = entPhysicalEntry
        3 = entLogicalEntry
The lower three bytes contain the relevant index value. */
typedef unsigned int sflow_data_source;
```

These changes are backward compatible with existing sFlow agents and existing sFlow collectors should be able to ignore and skip over the MIB entries and data structures relating to the logical data source type. Since there is very little functional overlap between Host sFlow and existing switch based sFlow, sending Host sFlow to a collector that does not support the standard should be avoided. As Host sFlow becomes more common, it is likely that many sFlow analyzers will be extended to support the new standard in order to provide integrated network and system monitoring functionality.

SNMP is a standard management protocol for network equipment and SFlow monitoring of switches is often facilitated by additional information obtained by SNMP (e.g. ifName, ifStack etc.). However, SNMP is much less frequently used in host monitoring. It is important that the Host sFlow structures define an internally consistent model of the host without depending on SNMP for important information. The new host_adapter structure provides the critical link between host performance statistics and sFlow implemented in network equipment. Identifying the MAC addresses associated with a physical or virtual network adapter allows traffic generated by that adapter to be identified on the network. The new host_parent structure is used to describe the containment hierarchy between virtual and physical machines.

The following counter_sample structures are defined to export performance and dependency information relating to physical and virtual machines:

```
/* Data structures for exporting Host statistics relating to
    logical and physical entities */
/* The machine_type enumeration may be expanded over time.
    Applications receiving sFlow must be prepared to receive
    host_descr structures with unknown machine_type values.
    The authoritative list of machine types will be maintained
    at www.sflow.org */
enum machine_type {
    unknown = 0,
    other   = 1,
    x86     = 2,
    x86_64  = 3,
    ia64    = 4,
    sparc   = 5,
    alpha   = 6,
    powerpc = 7,
    m68k    = 8,
    mips    = 9,
    arm     = 10,
    hppa    = 11,
    s390    = 12
}
/* The os_name enumeration may be expanded over time.
    Applications receiving sFlow must be prepared to receive
    host_descr structures with unknown machine_type values.
    The authoritative list of machine types will be maintained
    at www.sflow.org */
enum os_name {
    unknown   = 0,
    other     = 1,
    linux     = 2,
    windows   = 3,
    darwin    = 4,
    hpux      = 5,
    aix       = 6,
    dragonfly = 7,
    freebsd   = 8,
    netbsd    = 9,
    openbsd   = 10,
    osf       = 11,
    solaris   = 12
}
/* Physical or virtual host description */
/* opaque = counter_data; enterprise = 0; format = 2000 */
struct host_descr {
    string hostname<64>;        /* hostname, empty if unknown */
    opaque uuid<16>;            /* 16 bytes binary UUID, empty if unknown */
    machine_type machine_type;  /* the processor family */
    os_name os_name;            /* Operating system */
    string os_release<32>;      /* e.g. 2.6.9-42.ELsmp,xp-sp3, empty if unknown */
}
/* Physical or virtual network adapter NIC/vNIC */
struct host_adapter {
    unsigned int ifIndex;   /* ifIndex associated with adapter
        Must match ifIndex of vSwitch
        port if vSwitch is exporting sFlow
        0 = unknown */
    mac mac_address<>;      /* Adapter MAC address(es) */
}
/* Set of adapters associated with entity.
    A physical server will identify the physical network adapters
    associated with it and a virtual server will identify its virtual
    adapters. */
/* opaque = counter_data; enterprise = 0; format = 2001 */
struct host_adapters {
    adapter adapters<>;     /* adapter(s) associated with entity */
}
/* Define containment hierarchy between logical and physical
    entities. Only a single, strict containment tree is permitted,
    each entity must be contained within a single parent, but a parent
    may contain more than one child. The host_parent record is used
    by the child to identify its parent. Physical entities form the roots
    of the tree and do not send host_parent structures. */
/* opaque = counter_data; enterprise = 0; format = 2002 */
struct host_parent {
    unsigned int container_type;    /* sFlowDataSource type */
    unsigned int container_index;   /* sFlowDataSource index */
}
/* Extended socket information,
    Must be filled in for all application transactions associated with a network socket
```

-continued

```
        Omit if transaction associated with non-network IPC */
/* IPv4 Socket */
/* opaque = flow_data; enterprise = 0; format = 2100 */
struct extended_socket_ipv4 {
        unsigned int protocol;    /* IP Protocol type
              (for example, TCP = 6, UDP = 17) */
        ip_v4 local_ip;           /* local IP address */
        ip_v4 remote_ip;          /* remote IP address */
        unsigned int local_port;  /* TCP/UDP local port number or equivalent */
        unsigned int remote_port; /* TCP/UDP remote port number of equivalent */
}
/* IPv6 Socket */
/* opaque = flow_data; enterprise = 0; format = 2101 */
struct extended_socket_ipv6 {
        unsigned int protocol;    /* IP Protocol type
              (for example, TCP = 6, UDP = 17) */
        ip_v6 local_ip;           /* local IP address */
        ip_v6 remote_ip;          /* remote IP address */
        unsigned int local_port;  /* TCP/UDP local port number or equivalent */
        unsigned int remote_port; /* TCP/UDP remote port number of equivalent */
}
/*
   Physical server performance metrics
*/
/* Physical Server CPU */
/* opaque = counter_data; enterprise = 0; format = 2003 */
struct host_cpu {
        float load_one;           /* 1 minute load avg., -1.0 = unknown */
        float load_five;          /* 5 minute load avg., -1.0 = unknown */
        float load_fifteen;       /* 15 minute load avg., -1.0 = unknown */
        unsigned int proc_run;    /* total number of running processes */
        unsigned int proc_total;  /* total number of processes */
        unsigned int cpu_num;           /* number of CPUs */
        unsigned int cpu_speed;   /* speed in MHz of CPU */
        unsigned int uptime;      /* seconds since last reboot */
        unsigned int cpu_user;    /* user time (ms) */
        unsigned int cpu_nice;    /* nice time (ms) */
        unsigned int cpu_system;  /* system time (ms) */
        unsigned int cpu_idle;    /* idle time (ms) */
        unsigned int cpu_wio;     /* time waiting for I/O to complete (ms) */
        unsigned int cpu_intr;    /* time servicing interrupts (ms) */
        unsigned int cpu_sintr;         /* time servicing soft interrupts (ms) */
        unsigned int interrupts;  /* interrupt count */
        unsigned int contexts;    /* context switch count */
}
/* Physical Server Memory */
/* opaque = counter_data; enterprise = 0; format = 2004 */
struct host_memory {
        unsigned hyper mem_total; /* total bytes */
        unsigned hyper mem_free; /* free bytes */
        unsigned hyper mem_shared; /* shared bytes */
        unsigned hyper mem_buffers; /* buffers bytes */
        unsigned hyper mem_cached; /* cached bytes */
        unsigned hyper swap_total; /* swap total bytes */
        unsigned hyper swap_free; /* swap free bytes */
        unsigned int page_in;     /* page in count */
        unsigned int page_out;    /* page out count */
        unsigned int swap_in;     /* swap in count */
        unsigned int swap_out;    /* swap out count */
}
/* Physical Server Disk I/O */
/* opaque = counter_data; enterprise = 0; format = 2005 */
struct host_disk_io {
        unsigned hyper disk_total;    /* total disk size in bytes */
        unsigned hyper disk_free;     /* total disk free in bytes */
        percentage part_max_used;     /* utilization of most utilized partition */
        unsigned int reads;           /* reads issued */
        unsigned hyper bytes_read;    /* bytes read */
        unsigned int read_time;       /* read time (ms) */
        unsigned int writes;          /* writes completed */
        unsigned hyper bytes_written; /* bytes written */
        unsigned int write_time;      /* write time (ms) */
}
/* Physical Server Network I/O */
/* opaque = counter_data; enterprise = 0; format = 2006 */
struct host_net_io {
        unsigned hyper bytes_in; /* total bytes in */
        unsigned int pkts_in;    /* total packets in */
        unsigned int errs_in;    /* total errors in */
        unsigned int drops_in;   /* total drops in */
```

```
        unsigned hyper bytes_out; /* total bytes out */
        unsigned int packets_out; /* total packets out */
        unsigned int errs_out;    /* total errors out */
        unsigned int drops_out;   /* total drops out */
}
/*
  Hypervisor and virtual machine performance metrics
*/
/* Virtual Node Statistics */
/* See libvirt, struct virtNodeInfo */
/* opaque = counter_data; enterprise = 0; format = 2100 */
struct virt_node {
        unsigned int mhz;          /* expected CPU frequency */
        unsigned int cpus;         /* the number of active CPUs */
        nsigned hyper memory;      /* memory size in bytes */
        unsigned hyper memory_free; /* unassigned memory in bytes */
        unsigned int num_domains;  /* number of active domains */
}
/* Virtual Domain CPU statistics */
/* See libvirt, struct virtDomainInfo */
/* opaque = counter_data; enterprise = 0; format = 2101 */
struct virt_cpu {
        unsigned int state;        /* virtDomainState */
        unsigned int cpuTime;      /* the CPU time used (ms) */
        unsigned int nrVirtCpu;    /* number of virtual CPUs for the domain */
}
/* Virtual Domain Memory statistics */
/* See libvirt, struct virtDomainInfo */
/* opaque = counter_data; enterprise = 0; format = 2102 */
struct virt_memory {
        unsigned hyper memory;     /* memory in bytes used by domain */
        unsigned hyper maxMemory;  /* memory in bytes allowed */
}
/* Virtual Domain Disk statistics */
/* See libvirt, struct virtDomainBlockInfo */
/* See libvirt, struct virtDomainBlockStatsStruct */
/* opaque = counter_data; enterprise = 0; format = 2103 */
struct virt_disk_io {
        unsigned hyper capacity;   /* logical size in bytes */
        unsigned hyper allocation; /* current allocation in bytes */
        unsigned hyper available;  /* remaining free bytes */
        unsigned int rd_req;       /* number of read requests */
        unsigend hyper rd_bytes;   /* number of read bytes */
        unsigned int wr_req;       /* number of write requests */
        unsigned hyper wr_bytes;   /* number of written bytes */
        unsigned int errs;         /* read/write errors */
}
/* Virtual Domain Network statistics */
/* See libvirt, struct virtDomainInterfaceStatsStruct */
/* opaque = counter_data; enterprise = 0; format = 2104 */
struct virt_net_io {
        unsigned hyper rx_bytes;   /* total bytes received */
        unsigned int rx_packets;   /* total packets received */
        unsigned int rx_errs;      /* total receive errors */
        unsigned int rx_drop;      /* total receive drops */
        unsigned hyper tx_bytes;   /* total bytes transmitted */
        unsigned int tx_packets;   /* total packets transmitted */
        unsigned int tx_errs;      /* total transmit errors */
        unsigned int tx_drop;      /* total transmit drops */
}
```

The following pseudo-code describes one exemplary implementation of embodiments of the present invention.

```
while (true) {
    // obtain performance information for virtual machines
    for each (vm in virtual_machines) {
        // obtain virtual interface(s)
        // this function uses vendor specific APIs to identify the
        // network configuration for a VM
        vifs = get_vm_adapters(vm);
        // vendor specific API to retrieve CPU utilization relating to
        // a particular VM
        vcpu = get_vm_cpu_stats(vm);
        // vendor specific API to retrieve memory utilization relating
        // to a particular VM
        vmemory = get_vm_memory_stats(vm);
        // combine the information and send it to a remote collector
        //for analysis
        sflow_send_vm_statistics(vifs, vcpu, vmemory);
    }
    //  obtain physical host statistics
    // obtain physical interface(s) associated with physical interfaces
    // this function is operating system specific
    ifs = get_adapters( );
    // use OS specific API to retrieve CPU statistics
    cpu = get_cpu_stats( );
    // use OS specific APIs to retrieve memory statistics
    memory = get_memory_stats( );
```

```
        // combine information and send to remote collector for analysis
        sflow_send_statistics(ifs,cpu,memory);
            // wait until next polling time
            sleep(polling_interval);
}
```

In accordance with some embodiments of the present invention, the network traffic monitoring application links the performance of the network traffic to the performance statistics that include power consumption and temperature of the devices used in the network. Such measurements may be exported for each switch, server, switch port (power over Ethernet) or virtual machine. Accordingly, the power/temperature measurements are applicable to all devices disposed in the network including the servers. Since in such embodiments, the MAC address may not provide the common link among all the networked devices, the "data source identifier" variable, as defined by the sFlow® standard, may be used as a common key, linking the different types of statistics that are exported from a data source.

To achieve this, in accordance with one embodiment, the sFlow® standard is modified to include counters configure to enable the network devices to report power and temperature measurements. The following pseudo-code describes one exemplary implementation for use of such counters:

```
        /* Energy consumption */
/* opaque = counter_data; enterprise = 0; format = 3000 */
struct energy {
  unsigned hyper mJ; /* energy in millijoules */
  unsigned int pf; /* power factor (expressed as a percent), 0 for DC power
    */
}
/* Temperature */
/* opaque = counter_data; enterprise = 0; format = 3001 */
struct temperature {
  int oC<>; /* array of temperatures (1 for each thermometer) expressed
    in degrees Celsius */
}
```

Each measurement is scoped by the data source reporting it. For example, a switch may report the total power consumption for an entire device (as measured by its power supply), or may report power usage for each of its PoE ports. The counters, as described above, provide an efficient, multi-vendor technique for tracking power usage and temperature across all the devices and links in the network. The sFlow® counter polling is very efficient, thus providing a scalable technique for monitoring a large numbers of devices in a data center.

Incorporating power measurement enables linking of the power and temperature utilization to other statistics exported by the embodiments of the present invention. For example, as is known, one technique for reducing power consumption is virtual machine migration. By monitoring the switches in accordance with embodiments of the present invention, the location of the VM as well as the network bandwidth, protocols and traffic paths that it depends on are readily determined. In order to safely migrate the VM, a controller tracks these factors. Virtual machine migration changes network traffic utilizations and switch power consumption. Power and temperature monitoring, in accordance with the embodiments of the present invention, therefore enables power and temperature management to be carried out across both the network and the servers.

The above embodiments of the present invention are illustrative and not limitative. Various alternatives and equivalents are possible. Other additions, subtractions or modifications are obvious in view of the present invention and are intended to fall within the scope of the appended claims.

What is claimed is:

1. A method for generating a host performance statistics, the method comprising:
    associating a physical or virtual component of the host with network interface information corresponding to one or more physical or virtual network interface devices disposed in the host; and
    periodically transmitting performance statistics of the physical or virtual component together with the associated network interface information.

2. The method of claim 1 wherein the network interface information is at least one media access control (MAC) address associated with the one or more physical or virtual network interface devices.

3. The method of claim 2 wherein the performance statistics represent a CPU usage of the physical or virtual component.

4. The method of claim 2 wherein the performance statistics represent a memory usage of the physical or virtual component.

5. The method of claim 2 wherein the performance statistics represent a disk usage of the physical or virtual component.

6. The method of claim 2 wherein the performance statistics represent an I/O usage of the physical or virtual component.

7. The method of claim 2 wherein the performance statistics represent a power consumption of the physical or virtual component.

8. The method of claim 2 wherein the performance statistics represent a temperature of the physical or virtual component.

9. The method of claim 2 wherein the performance statistics represent a network flow through the physical or virtual component.

10. The method of claim 2 wherein the performance statistics represent a link utilization of the physical or virtual component.

11. The method of claim 1 wherein the network interface information is at least one SNMP ifIndex associated with the one or more physical or virtual network interface devices.

12. The method of claim 11 further comprising:
    using the SNMP ifIndex to retrieve a corresponding MAC address.

13. The method of claim 1 further comprising:
    analyzing the transmitted performance statistics of the physical or virtual component using the transmitted associated network interface information.

14. A computer readable medium comprising instructions that when executed by a processor cause the processor to generate performance statistics, the instructions further comprising the processor to:
    associate a physical or virtual component of a host with network interface information corresponding to one or more physical or virtual network interface devices disposed in the host; and
    transmit periodically performance statistics of the physical or virtual component together with the associated network interface information.

15. The computer readable medium of claim 14 wherein the network interface information is at least one media access control (MAC) address associated with the one or more physical or virtual network interface devices.

16. The computer readable medium of claim 15 wherein the performance statistics represent a power consumption of the physical or virtual component.

17. The computer readable medium of claim 15 wherein the performance statistics represent a temperature of the physical or virtual component.

18. The computer readable medium of claim 14 wherein the network interface information is at least one SNMP ifIndex associated with the one or more physical or virtual network interface devices.

19. The computer readable medium of claim 18 wherein the SNMP ifIndex is used to retrieve a corresponding MAC address.

20. The computer readable medium of claim 14 wherein the transmitted associated network interface information is used to analyze the transmitted performance statistics of the physical or virtual component.

21. The computer readable medium of claim 14 wherein the performance statistics represent a CPU usage of the physical or virtual component.

22. The computer readable medium of claim 14 wherein the performance statistics represent a memory usage of the physical or virtual component.

23. The computer readable medium of claim 14 wherein the performance statistics represent a disk usage of the physical or virtual component.

24. The computer readable medium of claim 14 wherein the performance statistics represent an I/O usage of the physical or virtual component.

25. The computer readable medium of claim 14 wherein the performance statistics represent a network flow through the physical or virtual component.

26. The computer readable medium of claim 14 wherein the performance statistics represent a link utilization of the physical or virtual component.

27. A system operative to generate performance statistics, the system comprising:
 a module operative to associate a physical or virtual component of a host with network interface information corresponding to one or more physical or virtual network interface devices disposed in the host; and
 a module operative to periodically transmit performance statistics of the physical or virtual component together with the associated network interface information.

28. The system of claim 27 wherein the network interface information is at least one media access control (MAC) address associated with the one or more physical or virtual network interface devices.

29. The system of claim 28 wherein the SNMP ifIndex is used to retrieve a corresponding MAC address.

30. The system of claim 28 wherein the performance statistics represent a CPU usage of the physical or virtual component.

31. The system of claim 28 wherein the performance statistics represent a memory usage of the physical or virtual component.

32. The system of claim 28 wherein the performance statistics represent a disk usage of the physical or virtual component.

33. The system of claim 28 wherein the performance statistics represent an I/O usage of the physical or virtual component.

34. The system of claim 28 wherein the performance statistics represent a power consumption of the physical or virtual component.

35. The system of claim 28 wherein the performance statistics represent a temperature of the physical or virtual component.

36. The system of claim 28 wherein the network performance statistics represent a network flow through the physical or virtual component.

37. The system of claim 28 wherein the performance statistics represent a link utilization of the physical or virtual component.

38. The system of claim 27 wherein the network interface information is at least one SNMP ifIndex associated with the one or more physical or virtual network interface devices.

39. The system of claim 27 wherein the transmitted network interface information is used to analyze the associated transmitted performance statistics of the physical or virtual component.

40. The system of claim 27 wherein said system modules are software modules.

41. The system of claim 27 wherein said system modules are hardware modules.

42. The system of claim 27 wherein said system include both software and hardware modules.

* * * * *